U S009239936B2

(12) United States Patent
Vasireddy et al.

(10) Patent No.: US 9,239,936 B2
(45) Date of Patent: Jan. 19, 2016

(54) SYSTEM, METHOD, AND APPARATUS TO MITIGATE RISK OF COMPROMISED PRIVACY

(71) Applicants: S. Rao Vasireddy, Holmdel, NJ (US); Uma Chandrashekhar, Morganville, NJ (US)

(72) Inventors: S. Rao Vasireddy, Holmdel, NJ (US); Uma Chandrashekhar, Morganville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 420 days.

(21) Appl. No.: 13/628,207

(22) Filed: Sep. 27, 2012

(65) Prior Publication Data

US 2014/0090090 A1    Mar. 27, 2014

(51) Int. Cl.
*H04L 29/06* (2006.01)
*G06F 21/62* (2013.01)
*G06F 21/57* (2013.01)

(52) U.S. Cl.
CPC .......... *G06F 21/6263* (2013.01); *G06F 21/577* (2013.01); *G06F 2221/2113* (2013.01)

(58) Field of Classification Search
CPC ....... G06F 21/31; G06F 21/577; G06F 21/10; G11B 20/0086
USPC .......................................... 713/182; 726/25–26
See application file for complete search history.

(56) References Cited

U.S. PATENT DOCUMENTS 8,375,427 B2 * 2/2013 Alavandar et al. ................ 726/7

OTHER PUBLICATIONS

Chun K. Chan et al., Role of SLAs in reducing vulnerabilities and recovering from disasters, 9 Bell Labs Technical Journal 2, 189-203 (Wiley Periodicals, Inc., 2004).

* cited by examiner

*Primary Examiner* — Joseph P Hirl
*Assistant Examiner* — Leynna Truvan
(74) *Attorney, Agent, or Firm* — Kramer & Amado, P.C.

(57) ABSTRACT

Various exemplary embodiments relate to a method and related network node including one or more of the following: retrieving a record of a first transaction, wherein the first transaction is associated with personally identifiable information of an owner; determining a first privacy risk value based on: a first transaction security metric associated with the first transaction, wherein the first transaction security metric includes a first set of security parameters, and a first set of weights correlated to the first set of security parameters; determining the current security status based on the first privacy risk value; and transmitting the current security status to the entity.

17 Claims, 4 Drawing Sheets

SYSTEM, METHOD, AND APPARATUS TO MITIGATE RISK OF COMPROMISED PRIVACY

CROSS-REFERENCE TO RELATED APPLICATIONS

This application is related to the following co-pending application, which is hereby incorporated herein by reference for all purposes: application Ser. No. 13/628,286, "SYSTEM, METHOD, AND APPARATUS TO EVALUATE TRANSACTION SECURITY RISK."

TECHNICAL FIELD

Various exemplary embodiments disclosed herein relate generally to information privacy.

BACKGROUND

Data privacy is a key concern for many entities, including individuals, corporations, and government agencies. As communications systems develop and become more ubiquitous, transfer of data, including sensitive or private data, becomes easier to perform and more difficult to restrict. Numerous networks, systems, services, and applications transmit and/or have access to private information. When a person reveals private information to another entity, it is difficult to ensure that the information will not be further disseminated, either through the information recipient sharing the information or having the information stolen. The lack of adequate mechanisms for protection of private data may create a trust and transparency deficiency which may hinder support of personalized applications and cloud computing solutions.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a central management system for notifying an entity of a current security status, the method including: retrieving a record of a first transaction, wherein the first transaction is associated with personally identifiable information of an owner; determining a first privacy risk value based on: a first transaction security metric associated with the first transaction, wherein the first transaction security metric includes a first set of security parameters, and a first set of weights correlated to the first set of security parameters; determining the current security status based on the first privacy risk value; and transmitting the current security status to the entity.

Various exemplary embodiments relate to a central management system for notifying an entity of a current security status, the method including: a transaction log storage configured to store a record of a first transaction, wherein the first transaction is associated with personally identifiable information of an owner; a risk analyzer configured to determine a first privacy risk value based on: a first transaction security metric associated with the first transaction, wherein the first transaction security metric includes a first set of security parameters, and a first set of weights correlated to the first set of security parameters; a risk aggregator configured to determine the current security status based on the first privacy risk value; and a status reporter configured to transmit the current security status to the entity.

Various exemplary embodiments relate to a non-transitory machine-readable storage medium encoded with instructions for execution by a central management system for notifying an entity of a current security status, the medium including: instructions for retrieving a record of a first transaction, wherein the first transaction is associated with personally identifiable information of an owner; instructions for determining a first privacy risk value based on: a first transaction security metric associated with the first transaction, wherein the first transaction security metric includes a first set of security parameters, and a first set of weights correlated to the first set of security parameters; instructions for determining the current security status based on the first privacy risk value; and instructions for transmitting the current security status to the entity.

Various embodiments are described wherein transmitting the current security status to the entity includes transmitting the current security status to a device associated with the owner.

Various embodiments additionally include selecting the set of weights from a plurality of sets of weights based on a transaction type of the first transaction.

Various embodiments additionally include selecting the set of weights from a plurality of sets of weights based on a user profile associated with the owner.

Various embodiments additionally include retrieving a record of a second transaction, wherein the second transaction is associated with the personally identifiable information of the owner; determining a second privacy risk value based on: a second transaction security metric associated with the second transaction wherein the second transaction security metric includes a second set of security parameters, and a second set of weights correlated to the second set of security parameters, wherein determining the current security status based on the first privacy risk value includes aggregating the first privacy risk and the second privacy risk into a single value.

Various embodiments are described wherein: determining the first privacy risk value is performed prior to retrieving the record of the first transaction, and the record of the first transaction stores the first privacy risk value.

Various embodiments are described wherein the first transaction is a transaction that was denied by the central management system.

Various exemplary embodiments relate to a method performed by a central management system for evaluating security risk of a transaction, the method including: receiving a request for a transaction associated with personally identifiable information (PII); determining values for a plurality of security parameters based on the requested transaction; determining that the transaction should be authorized based on the values for the plurality of security parameters; and based on determining that the transaction should be authorized, authorizing the transaction.

Various exemplary embodiments relate to a central management system for security risk of a transaction, the method including: a knowledge base storage; a risk analyzer configured to determining values for a plurality of security parameters based on a requested transaction, wherein the requested transaction is associated with personally-identifiable information; and an authenticator configured to: determine that the transaction should be authorized based on the values for the plurality of security parameters; and based on determining that the transaction should be authorized, authorize the transaction.

Various exemplary embodiments relate to a non-transitory machine-readable storage medium encoded with instructions for execution by a central management system for evaluating security risk of a transaction, the medium including: instructions for receiving a request for a transaction associated with personally identifiable information (PII); instructions for determining values for a plurality of security parameters based on the requested transaction; instructions for determining that the transaction should be authorized based on the values for the plurality of security parameters; and instructions for, based on determining that the transaction should be authorized, authorizing the transaction.

Various embodiments additionally include identifying a set of weights correlated to the plurality of security parameters, wherein determining that the transaction should be authorized based on the values for the plurality of security parameters includes determining that the transaction should be authorized based on the values for the plurality of security parameters and the set of weights.

Various embodiments are described wherein identifying the set of weights includes determining that at least a portion of the set of weights is specified by a user profile associated with an owner of the PII.

Various embodiments are described wherein identifying the set of weights includes determining that at least a portion of the set of weights is specified by a transaction profile associated with a transaction type of the transaction.

Various embodiments are described wherein determining that the transaction should be authorized includes evaluating at least one rule based on the values of the plurality of security parameters.

Various embodiments are described wherein authorizing the transaction includes transmitting an access token to at least one party associated with the transaction.

Various embodiments additionally include storing a record of the transaction, wherein the record of the transaction includes the values for the plurality of security parameters.

Various exemplary embodiments relate to a method performed by a central management system for evaluating security risk of a transaction, the method including: receiving a request for a transaction associated with personally identifiable information (PII); determining values for a plurality of security parameters based on the requested transaction; determining that the transaction should not be authorized based on the values for the plurality of security parameters; and based on determining that the transaction should not be authorized, denying the transaction.

Various exemplary embodiments relate to a central management system for security risk of a transaction, the method including: a knowledge base storage; a risk analyzer configured to determining values for a plurality of security parameters based on a requested transaction, wherein the requested transaction is associated with personally-identifiable information; and an authenticator configured to: determine that the transaction should not be authorized based on the values for the plurality of security parameters; and based on determining that the transaction should not be authorized, deny the transaction.

Various exemplary embodiments relate to a non-transitory machine-readable storage medium encoded with instructions for execution by a central management system for evaluating security risk of a transaction, the medium including: instructions for receiving a request for a transaction associated with personally identifiable information (PII); instructions for determining values for a plurality of security parameters based on the requested transaction; instructions for determining that the transaction should not be authorized based on the values for the plurality of security parameters; and instructions for, based on determining that the transaction should not be authorized, deny the transaction.

Various embodiments additionally include identifying a set of weights correlated to the plurality of security parameters, wherein determining that the transaction should not be authorized based on the values for the plurality of security parameters includes determining that the transaction should not be authorized based on the values for the plurality of security parameters and the set of weights.

Various embodiments are described wherein identifying the set of weights includes determining that at least a portion of the set of weights is specified by a user profile associated with an owner of the PII.

Various embodiments are described wherein identifying the set of weights includes determining that at least a portion of the set of weights is specified by a transaction profile associated with a transaction type of the transaction.

Various embodiments are described wherein determining that the transaction should not be authorized includes evaluating at least one rule based on the values of the plurality of security parameters.

Various embodiments are described wherein denying the transaction includes refraining from transmitting a response to the request.

Various embodiments additionally include storing a record of the transaction, wherein the record of the transaction includes the values for the plurality of security parameters.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

In view of the foregoing, it would be desirable to provide a solution capable of protecting the privacy of data while giving owners assurance that their private data is secure. For example, it would be desirable to provide a mechanism capable of computing, in real time, levels of privacy risk related to interactions between assets, devices, and software and other types of information transactions. It would further be desirable to alert owners of current privacy risks and/or take action on behalf of the owner when the private information is in use or otherwise visible and privacy thresholds are violated.

As used herein, the term "personally identifiable information" or "PII" may be used to refer to any data over which an owner of such data may wish to exert some restriction against unfettered dissemination.

Figure 1:
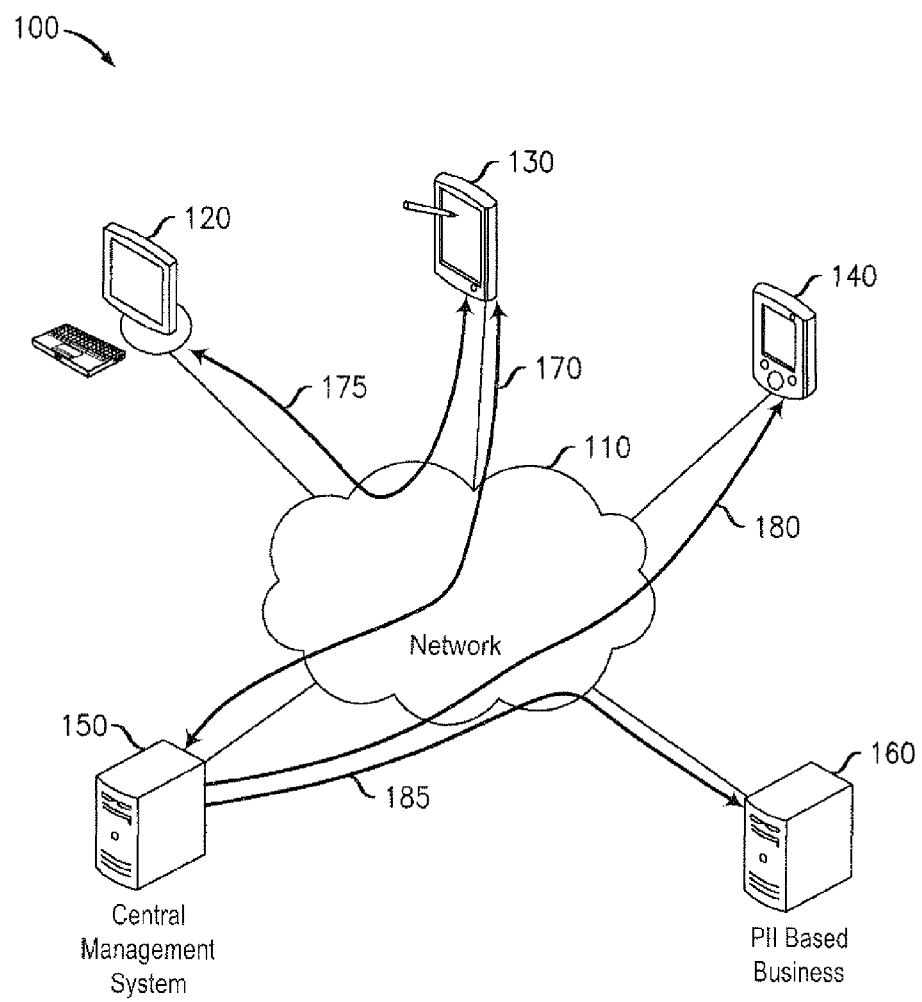
FIG. 1 illustrates an exemplary system supporting information transactions.

FIG. 1 illustrates an exemplary system 100 supporting information transactions. The system may include a network 110, to which a number of clients 120, 130, 140, a central management system (CMS) 150, and one or more PII-based businesses 160.

The network 110 may be any network for transferring data between devices. In various embodiments, the network 110 may include the Internet. In some embodiments, the network 110 may include ad hoc connections between devices such as, for example, a connection between RFID devices.

The clients 120, 130, 140 may include electronic devices, services, applications, and/or combinations thereof. It will be understood that, while only three clients are illustrated, the system 100 may include additional clients (not shown) that are parties to additional PII transactions. For example, a client may be a server, blade, PC, laptop, tablet, phone, RFID device, or any device that may exchange information with another device. RFID devices may include a toll-collection tag and reader or an electronic lock and a phone running an unlocking application. In the case where one or more clients 120, 130, 140 represent an application, such applications may include, for example, credit card validation applications. Clients 120, 130, 140 may alternatively or additionally represent agencies, people, or organizations such as, for example, banks. For the purposes of example, client device 120 may be a physician's computer including patient records, client device 130 may be a hospital tablet configured to display patient records, and client device 140 may be a mobile phone of a patient. As an example of a PII transaction, the hospital tablet 130 may request a patient record from the physician's computer.

The central management system (CMS) 150 may be a device, such as a server, blade, pc, laptop, tablet, phone, or RFID device. The CMS 150 may be configured to assess the privacy risk of various transactions both in real time and after completion. As will be described in greater detail below, the CMS 150 may receive requests for PII transactions between various clients 120, 130, 140. Upon receiving the request, the CMS 150 may evaluate various security parameters in light of the transaction type and user profile to determine a privacy risk for the transaction. Based on the determined privacy risk, the CMS 150 may allow or deny the requested transaction. If the transaction is allowed, the two client devices involved in the transaction may proceed to exchange the PII. For example, to request a patient record from the physician device 120, the hospital tablet 130 may first send a request approval of the PII transaction to the CMS 150 according to the communication path 170. The CMS 150 may evaluate parameters such as provided authentication credentials, the hospital's authorization level, the value of the requested information, compliance with the Health Insurance Portability and Accountability Act (HIPAA), and integrity of the network between the transacting devices to calculate a privacy risk for the transaction. If the privacy risk rises above a maximum acceptable risk threshold, the CMS 150 may deny the transaction. Otherwise, the CMS 150 may transmit a token to the hospital tablet 130 according to the communication path 170. Such may be presented to the physician's device 120 in exchange for the requested PII over communication path 175.

The CMS 150 may also periodically send status reports to the subjects of various PII transactions. To do so, the CMS 150 may log each approved and denied transaction along with the calculated security risk (hereinafter referred to as "completed transactions"). Based on the logged transactions for an owner, the CMS 150 may determine a current security status for the owner's information. This security status may then be transmitted for display on one or more devices known to be associated with the owner. For example, the CMS 150 may determine that the patient is associated with three recent completed transactions, one of which includes a denied attempt to access the patient's records. The CMS 150 may aggregate the privacy risks for these three transactions to generate a single value for the current security status. Such aggregation may weight each privacy risk according to the value of the PII. The security status may be associated with PII and the owner of such PII such as, in this example, the patient. The CMS 150 may then send this current security value to the patient's mobile phone 140 according to communication path 180. The mobile phone 140 may then integrate the received security value into a security meter displayed on the phone 140. Various additional methods for communicating a security value will be apparent such as, for example, an email or a pop-up window.

The PII based businesses 160 may include devices of various types of businesses that may also be interested in protecting the private data of various owners. For example, the PII based businesses 160 may include insurance companies offering PII liabilities on a per-transaction or per-application basis. Alternatively or additionally, the PII based businesses 160 may provide privacy protection services to subscribing owners. The PII based businesses 160 may develop various protection profiles and trust mechanisms to be enforced by the CMS 150. For example, the PII based businesses 160 may specify parameter weightings for certain transaction types and/or thresholds for transaction denial or allowance. In some embodiments, the CMS 150 may be further configured to transmit the current security status to PII based businesses that are known to be associated with the owner. For example, the CMS 150 may have a record identifying to which PII based businesses an owner subscribes and periodically transmit the current security status of the owner to those identified PII based businesses according to communication path 185.

While various exemplary embodiments are described within the context of exchange of patient record exchanges, the person of skill in the art will understand that the methods described herein may be applicable to various alternate types of PII transactions. For example, a social networking website may provide PII to advertisers or an e-commerce website may transmit a stored credit card number to a payment processor. Various additional types of PII transactions will be apparent.

Figure 2:
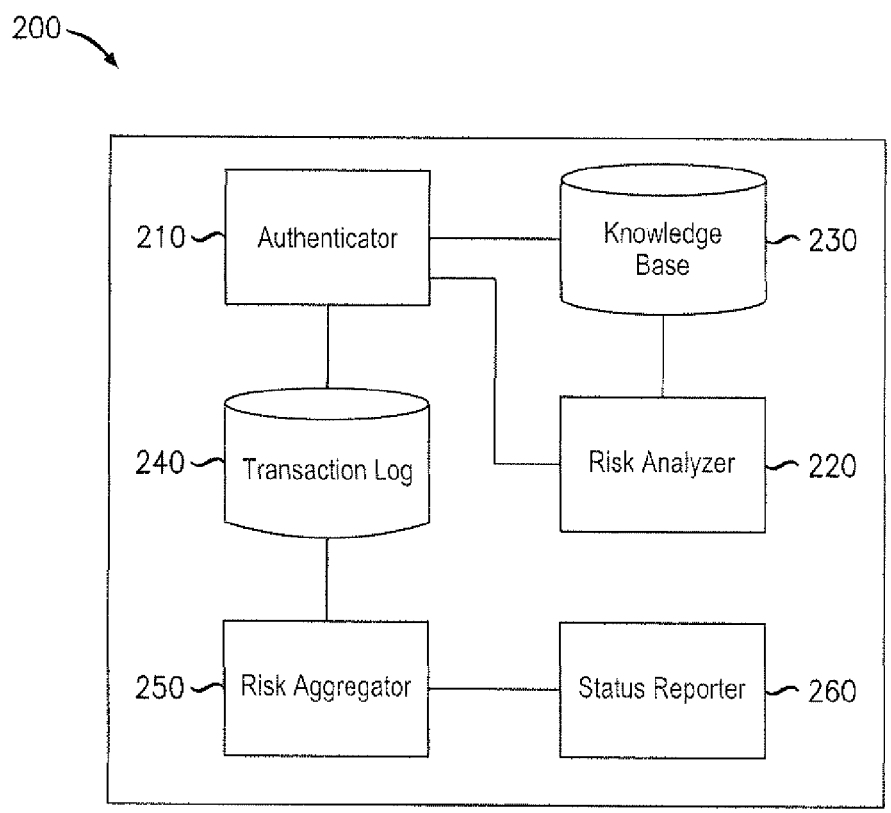
FIG. 2 illustrates an exemplary central management system.

FIG. 2 illustrates an exemplary central management system (CMS) 200. Exemplary CMS 200 may correspond to the CMS 150 of the exemplary system 100. The CMS 200 may include a plurality of components such as an authenticator 210, a risk analyzer 220, a knowledge base 230, a transaction log 240, a risk aggregator 250, and a status reporter 260. It will be apparent that one or more of the components of the CMS 200 may be an abstraction and may rely on other hardware (not shown). Further, various components may share hardware components and/or machine executable instructions. For example, the authenticator 210, the risk analyzer 220, the risk aggregator 250, and the status reporter 260 may all be implemented to utilize a common processor. As used herein, the term "processor" will be understood to encompass microprocessors, field programmable gate arrays (FPGAs), application-specific integrated circuits (ASICs), and other similar devices. As another example, the knowledge base 230 and the transaction log 240 may share a common storage device. Various additional or alternative hardware configurations and arrangements will be apparent.

The authenticator 210 may include hardware and/or instructions encoded on a machine readable medium configured to receive and handle requests for PII transactions. The authenticator 210 may receive such a request a privacy risk value from the risk analyzer 220. Based on the privacy risk value returned by the risk analyzer 220 and one or more access rules stored in the knowledge base 230, the authenticator 210 may approve or deny the request. For example, the authenticator 210 may determine whether the privacy risk value is above a maximum allowable risk threshold defined by an access rule. To deny the request, the authenticator 210 may respond to the requesting device with a denial message or may simply not respond to the request. To approve the request, the authenticator 210 may transmit a token to the requestor. The token may be a token that will be recognized as signifying CMS approval by the device that holds the requested PII. Alternatively, after receiving the token from the requesting device, the device that holds the requested PII may transmit the token back to the CMS 200. The CMS 200 may then respond to the device indicating whether the token is genuine and/or whether the transaction is approved. Accordingly, the CMS 200 may store a transmitted token for future reference. After completing a transaction, the authenticator 210 may store a record of the transaction in transaction log 240.

The risk analyzer 220 may include hardware and/or instructions encoded on a machine readable medium configured to generate a privacy risk value based on a received transaction request. As will be described in greater detail below with respect to FIG. 4, the risk analyzer 220 may evaluate a plurality of security parameters to generate a transaction security metric. The risk analyzer 220 may also locate a set of appropriate weight values for the parameters. Applying such weights, the risk analyzer 220 may consolidate the transaction security metric into a single privacy risk value. The set of weights may be determined, for example, based on a user profile and/or a transaction type. Thus, the method of calculating privacy risk may be different for different owners and/or different types of transactions.

The knowledge base 230 may include a device that stores information used by the CMS 200 to process transaction requests and analyze privacy risk. Thus, the knowledge base 230 may include a machine-readable storage medium such as read-only memory (ROM), random-access memory (RAM), magnetic disk storage media, optical storage media, flash-memory devices, and/or similar storage media. Exemplary contents of knowledge base 230 will be described in greater detail below with respect to FIG. 3.

The transaction log 230 may include a device that records of completed transactions. Thus, the transaction log 230 may include a machine-readable storage medium such as read-only memory (ROM), random-access memory (RAM), magnetic disk storage media, optical storage media, flash-memory devices, and/or similar storage media. The transaction log 230 may store records of completed transactions. Each record may include information such as the requested PTT, the parties to the transaction, the owner to which the HI belongs, the calculated privacy risk, and/or the time of the transaction. It will be apparent that various alternative and/or additional information about a transaction may be stored in a record of a transaction.

The risk aggregator 250 may include hardware and/or instructions encoded on a machine readable medium configured to generate a current privacy status. The risk aggregator 250 may periodically locate any transactions regarding an owner stored in the transaction log 240. In various embodiments, the risk aggregator may ignore or placed decreased value on records of a certain age or records marked as resolved. The risk aggregator 250 may then aggregate the privacy risk value of the located records into a single security status value. Various methods for aggregating the privacy risk values will be apparent. For example, the risk aggregator 250 may average the values, select the most recent value, or select the maximum value or worst case value for a specific transaction and associated value to the PII owner.

The status reporter 260 may include hardware and/or instructions encoded on a machine readable medium configured to report a current security status generated by the risk aggregator 250 to one or more interested entities. For example, the status reporter 260 may transmit a message including the current security status to a device known to be associated with the owner to which the security status applies. As another example, the status reporter 260 may transmit a message including the current security status to one or more PII based businesses known to be associated with the owner.

Figure 3:
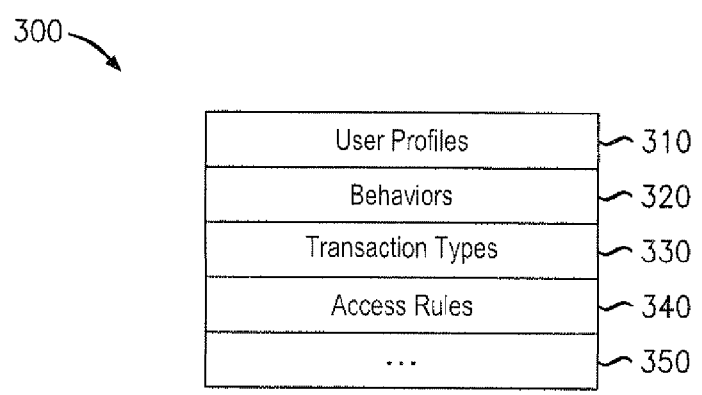
FIG. 3 illustrates an exemplary knowledge base.

FIG. 3 illustrates exemplary contents for a knowledge base 300. As shown, the knowledge base may include data related to user profiles 310, behaviors, 320, transaction types 330, and access rules 340. It will be apparent that the knowledge base 300 may include additional information 350 useful in determining a privacy risk for a transaction.

The user profiles 310 may include profiles for each owner. The user profiles 310 may be uploaded to the CMS or otherwise defined by the owners, PII backed businesses, and/or other entities. The user profiles 310 may identify one or more sets of PII to be restricted along with information useful in evaluating a privacy risk with regard to the PII. For example, the user profiles 310 may identify entities authorized to access the PII, values associated with the PII, and weights for various security parameters. In this manner, the user profiles 310 may determine, at least in part, risk for a specific transaction.

The behaviors 320 may include information related to behavioral patterns of owners. In various embodiments, the CMS and/or owner devices may learn the owner's preferences by observing behavioral patterns and manual input. For example, before initiating a transaction, a owner may be given the option to select a secure transaction, not select a secure transaction, or automatically select the best available choice of security. Based on this input, the CMS and/or owner device may detect a pattern in the owner's responses. For example, the owner may always select a secure transaction for transactions related to health records. Secure transactions may include various transactions such as, for example, a specified type of authentication, creation of log files, and creation of tokens. These behavioral patterns may be stored as part of the behaviors 320 and may be used to take automatic action on behalf of the owner in the future. Additionally or alternatively, the behaviors 320 may be used to weight security parameters when calculating a privacy risk.

The transaction types 330 may define information used in evaluating different types of transactions. In various embodiments, the transaction types 330 may specify, at least in part, a set of weights to be used in evaluating the risk of transactions of that type. For example, the transaction types 330 may specify "patient data transfer" as a type of transaction. The transaction types 330 may go on to specify that a legal compliance parameter should be given an increased weight to ensure compliance with HIPAA. Alternative or additional weighting values for parameters will be apparent. In this manner, the transaction types 330 may determine, at least in part, risk for a specific transaction.

The access rules 340 may define one or more rules for approving or denying requests. Each access rule 340 may be associated, for example, with an owner, a set of PII, a type of PII, a type of transaction, or a combination thereof. The access rule 340 may also specify a maximum privacy risk threshold. As such, the access rules may specify when a transaction request should be denied and when the request should be approved. Various alternative methods for defining rules will be apparent. For example, a rule may alternatively or additionally specify required values, required ranges, and/or thresholds for specific security parameters.

Figure 4:
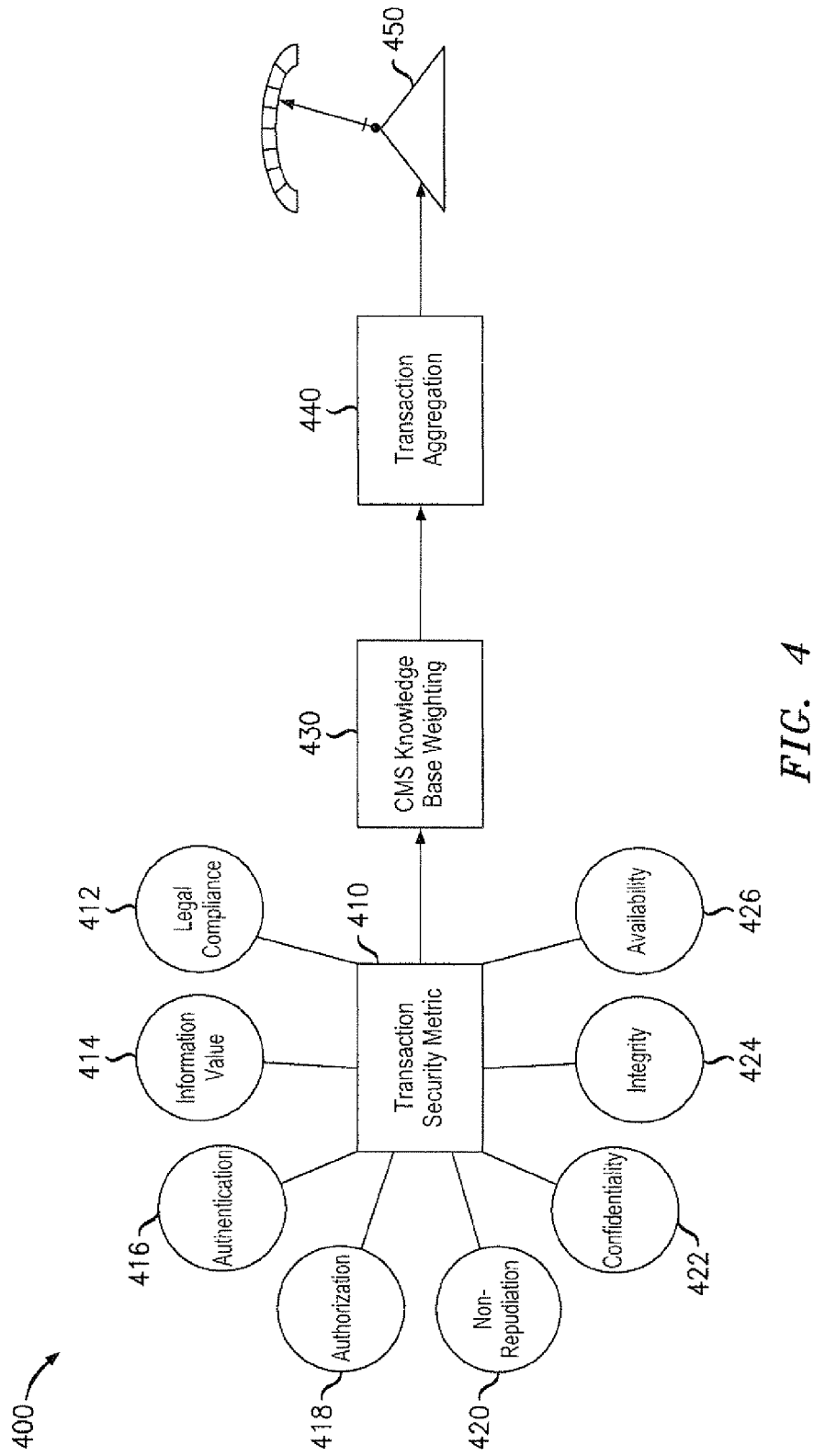
FIG. 4 illustrates an exemplary processing flow to evaluate a current security status.

FIG. 4 illustrates an exemplary processing flow 400 to evaluate a current security status. The processing flow 400 may illustrate the steps taken by a CMS such as CMS 150 and/or CMS 200 in generating a privacy risk value and a current security status value. Upon receiving a request for a PII transaction, the CMS may determine values for a set of security parameters that will make up the transaction security metric 410 for the PII transaction. As illustrated, the transaction security metric 410 may include eight security parameters: legal compliance 412, information value 414, authentication 416, authorization 418, non-repudiation 420, confidentiality 422, integrity 424, and availability 426. Various additional or alternative security parameters will be apparent.

Legal compliance 412 may be a value specifying whether and/or to what degree a requested transaction complies with relevant laws. Information value 414 may be a value, such as a dollar amount, of the requested PII. Information value 414 may be the value specified by a user in the relevant user profile. Authentication 416 may be a value specifying whether the requester was authenticated such as, for example, by providing authentication credentials. Authorization 418 may be a value specifying a level of authorization assigned to a requestor such as, for example, an authorization assigned by the owner. Non-repudiation 420 may be a value representing the ability of the authentication technology used to verify the requestor's identity without inadvertently authenticating a non-trusted party. Confidentiality 422 may be a value representing the degree of confidence in the encryption techniques used on the PII when in transit. Integrity 424 may be a value representing the communication capabilities between the parties such as, for example, whether desired IP protocols are supported. Availability 426 may be a value representing whether and to what degree the network structure is considered highly available and free from outages.

After generating the transaction security metric from various data sources, the CMS may proceed to apply a set of weights 430 to the parameters of the transaction security metric to generate a privacy risk value. The CMS may determine this set of weights based on the information stored in the knowledge base, such as user profiles, transaction types, and behaviors. The CMS may also apply one or more functions to the weighted values to generate a single privacy risk value. This privacy risk value may be used in evaluating a present transaction for purposed of approval or denial.

Periodically, the CMS may aggregate 440 multiple calculated privacy risk values to generate a current security status. For example, the CMS may select the maximum privacy risk calculated for an owner in the trailing week. Additional methods of aggregation will be apparent. After calculating the current security status, the CMS may transmit the security status to one or more entities, such as by transmitting the status to a phone of the owner. The phone may then display a meter 450 or otherwise communicate the value of the security status to the owner.

Figures 5, 6:
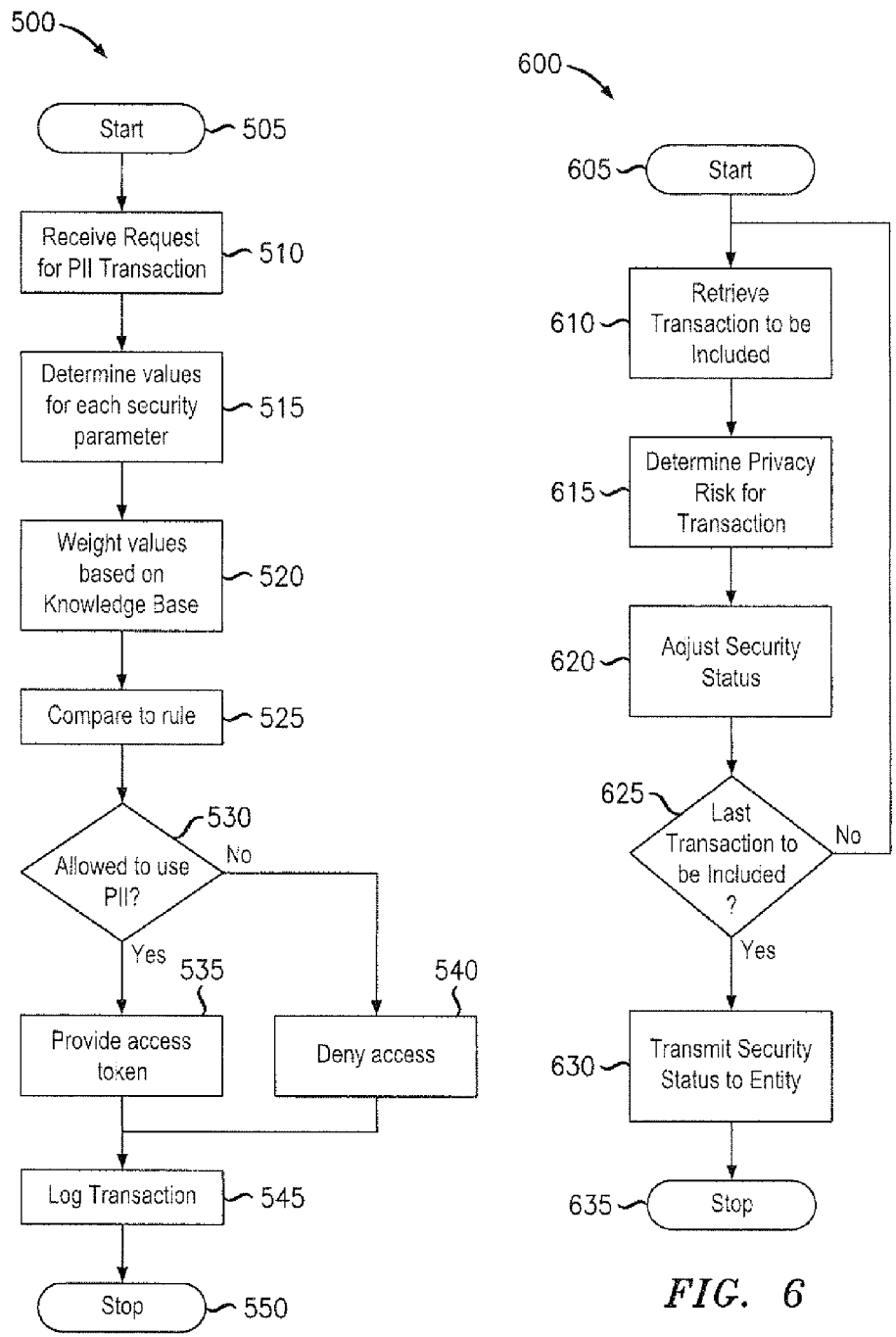
FIG. 5 illustrates an exemplary method for evaluating a current transaction.
FIG. 6 illustrates an exemplary method for determining a current security status.

FIG. 5 illustrates an exemplary method 500 for evaluating a current transaction. The method 500 may be performed by the components CMS 200 such as, for example, the authenticator 210 and the risk analyzer 220.

The method 500 may begin in step 505 and proceed to step 510 where the CMS 200 may receive a request for a PII transaction. Next, in step 515, the CMS may generate a transaction security metric by determining values for each security parameter. Step 515 may involve gathering data from multiple sources such as, for example, the request, user profiles, transaction types, previously-logged transactions, and/or various network devices. Next, in step 520, the CMS 200 may generate a privacy risk value by applying a set of weights to the parameters determined in step 515. Identification of an appropriate set of weights may include reference to an appropriate user profile, behaviors, and/or transaction type, as previously described. Then, in step 525, the CMS 200 may compare the privacy risk value to one or more applicable rules for the transaction. For example, the CMS 200 may determine whether the privacy risk value surpasses a maximum risk threshold set by the rule.

In step 530, the CMS 200 may determine whether the outcome of step 525 indicates that the transaction should be allowed to proceed. If so, the method 500 may proceed to step 535 where the CMS 200 may provide an access token to the requestor. The access token may be used by the requestor to retrieve the requested PII. If, on the other hand, the outcome of step 525 indicates that the request should be denied, the CMS 200 may, in step 540, deny the access. To deny access, the CMS 200 may, for example, transmit a denial message to the requestor or simply not respond to the request received in step 510. The method 500 may proceed from step 535 or step 540 to step 545. In step 545, the CMS 200 may log the completed transaction by storing a record for future use. The record may include, for example, details of the request received in step 510 and/or the privacy risk value computed in step 520. The method 500 may then proceed to end in step 550.

FIG. 6 illustrates an exemplary method 600 for determining a current security status. The method 600 may be performed by the components CMS 200 such as, for example, risk aggregator 250 and the status reporter 260.

The method 600 may begin in step 605 and proceed to step 610 where the CMS 200 may retrieve a first transaction record to be included in the evaluation of the security status. For example, the CMS 200 may retrieve the first-encountered transaction associated with the owner being evaluated. Next, the CMS 200 may determine a privacy risk for the current transaction. In various embodiments, the CMS 200 may simply retrieve a privacy risk value stored in the record. In other embodiments, the CMS 200 may alter a previous privacy risk value based on newly-acquired information about the transaction or may recalculate the privacy risk value entirely. After determining the privacy risk value, the CMS 200 may, in step 620, adjust the security status value based on the current privacy risk value. For example, where the aggregation method involves identifying the highest logged privacy risk, the CMS 200 may set the current security status to the value of the privacy risk value when the privacy risk value would be greater than the current security status.

Next, in step 625, the CMS 200 may determine if additional transaction records remain to be processed for the owner. If so, the method 600 may loop back to step 610. Otherwise, if the current transaction is the last transaction to be included, the method 600 may proceed to step 630 where the CMS 200 may transmit the security status to one or more interested entities. For example, the CMS 200 may transmit messages including the security status to a device associated with the owner and one or more devices associated with interested PII based businesses. The method 600 may then proceed to end in step 635.

It will be understood that the various transactions processed according to method 600 may relate to similar or different PII as compared to other transactions. Further the PII may include primary PII (e.g., a social security number or name) and/or derived PII (e.g., location information associated with a social security number known via correlation or analytics). It will further be understood that various modifications may be made to the exemplary methods 500, 600 described herein. For example, in various embodiments, such as those embodiments utilizing different aggregation methods, the step 620 may be performed outside of the loop, after step 625, such that the security status is not determined until all privacy risk values to be included have been determined. Further, some steps may be performed in parallel. Additional modifications will be apparent.

According to the foregoing, various embodiments enable a solution capable of protecting the privacy of data while giving owners assurance that their private data is secure. For example, by evaluating security parameters at the time of an information transaction and applying transaction- and owner-specific weightings, a central management system may provide robust and customizable control over what entities access personally identifiable information of an owner. Further, by evaluating completed transactions, an owner and other interested entities may be provided with a metric representative of the safety of private information, thereby fostering trust and transparency in the entities managing the private information.

In view of the foregoing, it would be desirable to provide a solution capable of protecting the privacy of data while giving owners assurance that their private data is secure. For example, it would be desirable to provide a mechanism capable of computing, in real time, levels of privacy risk related to interactions between assets, devices, and software and other types of information transactions. It would further be desirable to alert owners of current privacy risks and/or take action on behalf of the owner when the private information is in use or otherwise visible.

It should be apparent from the foregoing description that various exemplary embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a central management system for notifying an entity of a current security status, the method comprising:
   retrieving a record of a first transaction and a record of a second transaction, wherein the first transaction and second transaction are respectively associated with exchanges of personally identifiable information of an owner between two devices;
   determining a first privacy risk value based on:
      a first transaction security metric associated with the first transaction, wherein the first transaction security metric includes a first set of security parameters, and
      a first set of weights correlated to the first set of security parameters,
      wherein the first privacy risk value is created by combining security parameters of the first set of security parameters together based on respective weights of the first set of weights;
   determining a second privacy risk value based on:
      a second transaction security metric associated with the second transaction wherein the second transaction security metric includes a second set of security parameters, and
      a second set of weights correlated to the second set of security parameters,
      wherein the second privacy risk value is created by combining security parameters of the second set of security parameters together based on respective weights of the second set of weights;
   determining the current security status based on aggregating the first privacy risk value and the second privacy risk value into a single value; and
   transmitting the current security status to the entity.

2. The method of claim 1, wherein transmitting the current security status to the entity comprises transmitting the current security status to a device associated with the owner.

3. The method of claim 1, further comprising selecting the set of weights from a plurality of sets of weights based on a transaction type of the first transaction.

4. The method of claim 1, further comprising selecting the set of weights from a plurality of sets of weights based on a user profile associated with the owner.

5. The method of claim 1, wherein:
   determining the first privacy risk value is performed prior to retrieving the record of the first transaction, and
   the record of the first transaction stores the first privacy risk value.

6. The method of claim 1, wherein the first transaction is a transaction that was denied by the central management system.

7. A central management system for notifying an entity of a current security status, the system comprising:
   a transaction log storage configured to store a record of a first transaction and a second transaction, wherein the first transaction and second transaction are associated with respective exchanges of personally identifiable information of an owner between two devices;

a risk analyzer configured to:
   determine a first privacy risk value based on:
      a first transaction security metric associated with the first transaction, wherein the first transaction security metric includes a first set of security parameters, and
      a first set of weights correlated to the first set of security parameters,
      wherein the first privacy risk value is created by combining security parameters of the first set of security parameters together based on respective weights of the first set of weights, and
   determine a second privacy risk value based on:
      a second transaction security metric associated with the second transaction, wherein the second transaction security metric includes a second set of security parameters, and
      a second set of weights correlated to the second set of security parameters,
      wherein the second privacy risk value is created by combining security parameters of the second set of security parameters together based on respective weights of the second set of weights;
a risk aggregator configured to determine the current security status based on aggregating the first privacy risk value and the second privacy risk value into a single value; and
a status reporter configured to transmit the current security status to the entity.

8. The central management system of claim 7, wherein, in transmitting the current security status to the entity, the status reporter is configured to transmit the current security status to a device associated with the owner.

9. The central management system of claim 7, wherein the transaction is associated with a transaction type and wherein the risk analyzer is further configured to select the set of weights from a plurality of sets of weights based on the transaction type.

10. The central management system of claim 7, further comprising a knowledge base storage configured to store a user profile associated with the owner, wherein the risk analyzer is further configured to select the set of weights from a plurality of sets of weights based on the user profile.

11. The central management system of claim 7, wherein the first transaction is a transaction that was denied by the central management system.

12. A non-transitory machine-readable storage medium encoded with instructions for execution by a central management system for notifying an entity of a current security status, the medium comprising:
   instructions for retrieving a record of a first transaction and a record of a second transaction, wherein the first transaction and second transaction are respectively associated with exchanges of personally identifiable information of an owner between two devices;
   instructions for determining a first privacy risk value based on:
      a first transaction security metric associated with the first transaction, wherein the first transaction security metric includes a first set of security parameters, and
      a first set of weights correlated to the first set of security parameters,
      wherein the first privacy risk value is created by combining security parameters of the first set of security parameters together based on respective weights of the first set of weights;
   instructions for determining a second privacy risk value based on:
      a second transaction security metric associated with the second transaction wherein the second transaction security metric includes a second set of security parameters, and
      a second set of weights correlated to the second set of security parameters,
      wherein the second privacy risk value is created by combining security parameters of the second set of security parameters together based on respective weights of the second set of weights;
   instructions for determining the current security status based on aggregating the first privacy risk value and the second privacy risk value into a single value; and
   instructions for transmitting the current security status to the entity.

13. The non-transitory machine-readable storage medium of claim 12, wherein the instructions for transmitting the current security status to the entity comprise instructions for transmitting the current security status to a device associated with the owner.

14. The non-transitory machine-readable storage medium of claim 12, further comprising instructions for selecting the set of weights from a plurality of sets of weights based on a transaction type of the first transaction.

15. The non-transitory machine-readable storage medium of claim 12, further comprising instructions for selecting the set of weights from a plurality of sets of weights based on a user profile associated with the owner.

16. The non-transitory machine-readable storage medium of claim 12, wherein:
   the instructions for determining the first privacy risk value are executed prior to the instructions for retrieving the record of the first transaction, and
   the record of the first transaction stores the first privacy risk value.

17. The non-transitory machine-readable storage medium of claim 12, wherein the first transaction is a transaction that was denied by the central management system.

* * * * *

UNITED STATES PATENT AND TRADEMARK OFFICE
CERTIFICATE OF CORRECTION

PATENT NO. : 9,239,936 B2
APPLICATION NO. : 13/628207
DATED : January 19, 2016
INVENTOR(S) : S. Rao Vasireddy et al.

It is certified that error appears in the above-identified patent and that said Letters Patent is hereby corrected as shown below:

On the title page, in item (54), and in the specification, column 1, replace

"SYSTEM, METHOD, AND APPARATUS TO MITIGATERISK OF COMPROMISED PRIVACY"

with --SYSTEM, METHOD, AND APPARATUS TO MITIGATE RISK OF COMPROMISED PRIVACY--

Signed and Sealed this
Nineteenth Day of April, 2016

Michelle K. Lee
*Director of the United States Patent and Trademark Office*